United States Patent
Li

(10) Patent No.: US 6,749,221 B2
(45) Date of Patent: Jun. 15, 2004

(54) ACTIVE STEERING COLUMN ENERGY ABSORBING DEVICE

(75) Inventor: Xiaoyu Li, Saginaw, MI (US)

(73) Assignee: Delphi Technologies, Inc., Troy, MI (US)

( * ) Notice: Subject to any disclaimer, the term of this patent is extended or adjusted under 35 U.S.C. 154(b) by 20 days.

(21) Appl. No.: 10/184,456

(22) Filed: Jun. 28, 2002

(65) Prior Publication Data

US 2004/0000780 A1 Jan. 1, 2004

(51) Int. Cl.[7] ................................................. B62D 1/19
(52) U.S. Cl. ........................ 280/777; 74/492; 188/371
(58) Field of Search ........................ 280/777; 188/374; 74/492

(56) References Cited

U.S. PATENT DOCUMENTS

| | | | | |
|---|---|---|---|---|
| 3,696,891 A | * | 10/1972 | Poe | 188/268 |
| 4,630,716 A | * | 12/1986 | Faust | 188/371 |
| 4,946,194 A | * | 8/1990 | Maeda et al. | 280/777 |
| 5,375,881 A | * | 12/1994 | Lewis | 280/777 |
| 5,487,562 A | * | 1/1996 | Hedderly et al. | 280/777 |
| 5,517,877 A | * | 5/1996 | Hancock | 74/492 |
| 6,152,488 A | * | 11/2000 | Hedderly et al. | 280/775 |
| 6,176,151 B1 | | 1/2001 | Cymbal | |
| 6,189,929 B1 | * | 2/2001 | Struble et al. | 280/777 |
| 6,296,280 B1 | * | 10/2001 | Struble et al. | 280/777 |
| 6,322,103 B1 | * | 11/2001 | Li et al. | 280/777 |
| 6,439,357 B1 | * | 8/2002 | Castellon | 188/374 |
| 6,450,532 B1 | | 9/2002 | Ryne et al. | |
| 6,454,302 B1 | | 9/2002 | Li et al. | |
| 6,575,497 B1 | | 6/2003 | McCarthy et al. | |
| 2002/0020999 A1 | | 2/2002 | Duval, et al. | |

* cited by examiner

*Primary Examiner*—Peter M. Poon
*Assistant Examiner*—Bret Hayes
(74) *Attorney, Agent, or Firm*—Michael D. Smith

(57) ABSTRACT

An active energy absorbing system including a steering column housing movable on a collapse stroke. An energy absorbing device is mounted on the steering column housing and exerts a resistance force against the movement of the steering column housing along its collapse stroke. The energy absorbing device includes a base unit having an adjustable deforming member disposed within. A deformable strap is also housed by the base unit and is attached at one end to a vehicle structure. The deformable strap engages the adjustable deforming member. An actuator is associated with the base unit and adjusts the adjustable deforming member. A spring attachment member is associated with the base unit and includes an adjustment portion that engages the adjustable deforming member and provides for movement of the adjustable deforming member to vary the total active surface area engaging the deformable strap. A stop is associated with the base unit and is positioned to interact with the adjustment portion of the spring attachment member such that removal of stop by the actuator in response to a control parameter allows for adjustment of the adjustable deforming member such that an optimized energy absorbing load is provided.

25 Claims, 4 Drawing Sheets

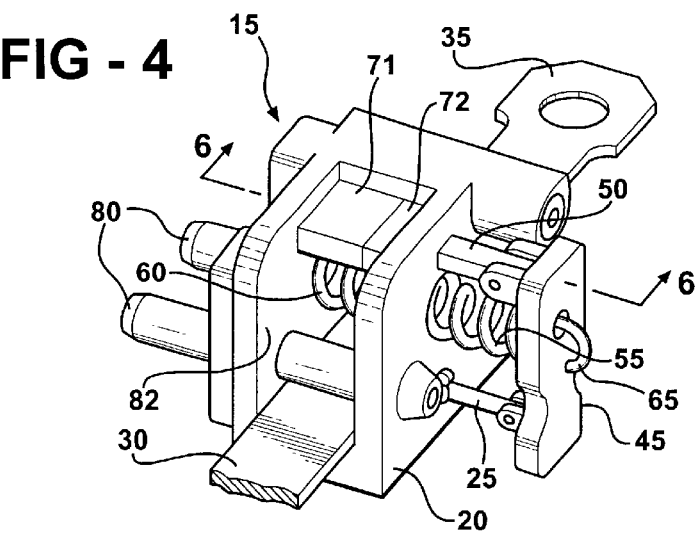
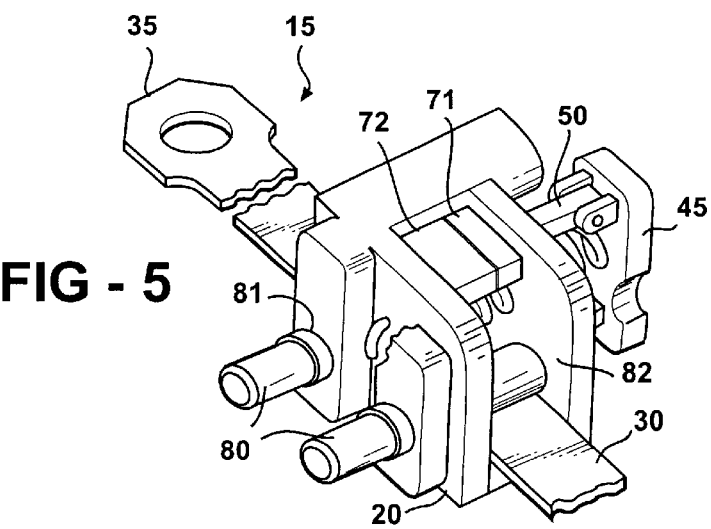
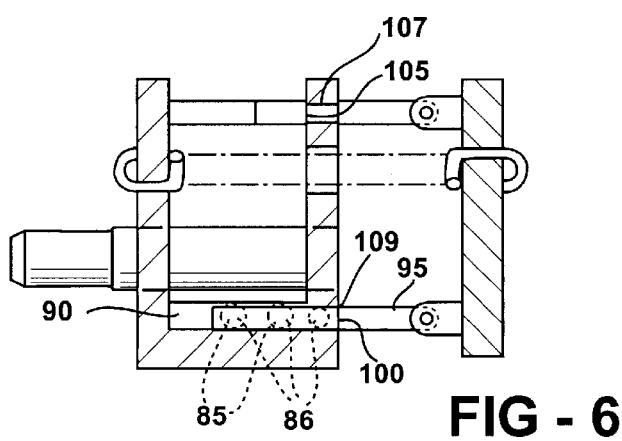

ACTIVE STEERING COLUMN ENERGY ABSORBING DEVICE

TECHNICAL FIELD

The invention generally relates to an active energy absorbing system for a motor vehicle steering column, and more particularly, to an active energy absorbing system that adjusts the energy absorbing load according to driver and crash characteristics, as the column collapses.

BACKGROUND OF THE INVENTION

Energy absorbing steering columns on a motor vehicle generally include a housing that translates linearly through a collapse stroke during a collision. A force generated by the driver from an impact with the steering wheel initiates the collapse stroke. The steering wheel housing moves against a resisting force that may be produced by an energy absorber designed to convert a portion of the driver's kinetic energy into work. The resisting force may be generated utilizing systems currently known in the art, including the plastic deformation of a metal element that is a part of an energy absorbing device.

Generally, traditional energy absorbing devices have a fixed energy absorbing curve which is optimized to protect a given group of drivers, in most cases represented by an average size male driver. To better protect other groups of drivers not belonging to the average male driver group, such as smaller female drivers or large drivers, an adjustable energy absorbing device is needed in the art.

It is, therefore, desirable for an energy absorbing device to be adjustable based upon a given driver size and his position, as well as include variables for the severity of the collision. It is also desirable to use an energy absorbing device that is capable of adjusting in a time frame similar to that of an airbag system. Therefore, to account for the severity of the collision, and act at the same time as an airbag, an energy absorbing device should be capable of adjustment within a few milliseconds of time such that a given load curve can be utilized by the device based on the severity of the collision and the characteristics of the driver.

There is, therefore, a need in the art for an active energy absorbing device that is capable of adjusting to account for the severity of a collision, as well as the characteristics of the driver. Such an energy absorbing system should be able in a few milliseconds such that it has similar response times to that of an airbag deployment.

SUMMARY OF THE INVENTION

An active energy absorbing system including a steering column housing that is movable along a collapse stroke. There is also included an energy absorbing device mounted on the steering column housing that exerts a resistance force for resisting movement of the steering column along the collapse stroke. The energy absorbing device includes a base unit and an adjustable deforming member disposed within the base unit. A deformable strap is housed by the base unit and attached at one end to a vehicle structure. The deformable strap engages the adjustable deforming member. An actuator is associated with the base unit and adjusts the adjustable deforming member. A spring attachment member is associated with the base unit and includes a spring attachment member that has an adjustment portion. A spring is attached to the base unit at one end and to the spring attachment member at another. At least one stop is associated with the base unit and is positioned to interact with the adjustment portion of the spring attachment member. The actuator moves the at least one stop in response to a control parameter wherein the adjustable deforming member is adjusted to correspond to an optimized energy absorbing load.

BRIEF DESCRIPTION OF THE DRAWINGS

These and other features and advantages of the present invention will become more readily appreciated when considered in connection with the following detailed description and appended drawings, where:

FIG. 4 is a perspective view detailing a first embodiment of the energy absorbing device of the present invention;

FIG. 5 is a perspective view detailing a first embodiment of the energy absorbing device of the present invention;

FIG. 6 is a sectional view of the first embodiment; and

DETAILED DESCRIPTION OF THE PREFERRED EMBODIMENTS

Figure 1:
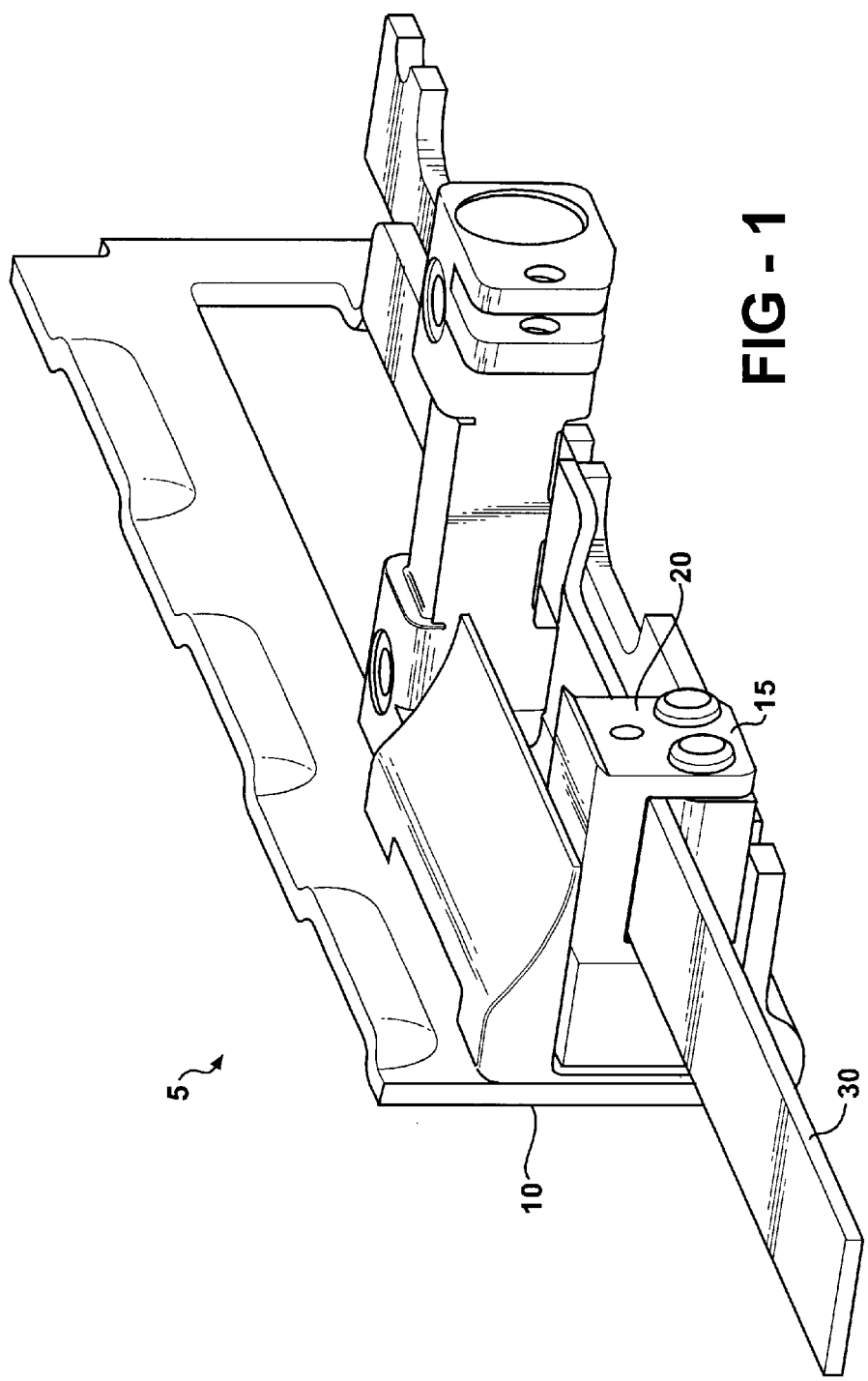
FIG. 1 is a partial perspective view of the active energy absorbing system of the present invention.
Figure 2:
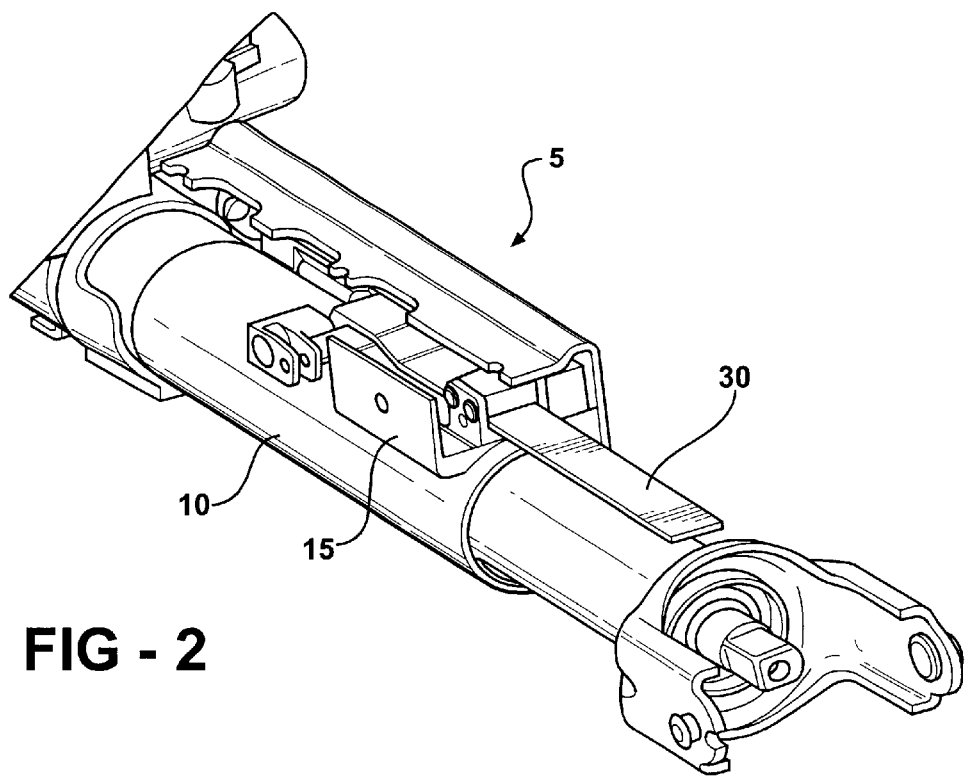
FIG. 2 is a partial perspective view showing the active energy absorbing device attached to a steering column.

Referring to FIGS. 1 and 2, there is shown the active energy absorbing system 5 of the present invention in conjunction with a steering column housing 10 that moves along a collapse stroke corresponding to a force of impact by a driver.

During a collision, a vehicle body decelerates through the interaction with another body, while the driver maintains his momentum such that he is thrust against the steering handwheel with a force of impact. The force of impact by the operator initiates linear translation of the steering column housing 10 in a collapse stroke that is in the direction of the centerline of the steering column 10. An energy absorbing device 15 exerts a resistance force for resisting the movement of the steering column housing 10 along the collapse stroke. The energy absorbing device 15 includes a base unit 20 that has an adjustable deforming member 25 disposed within. A deformable strap 30 is housed by the base unit and is attached at one end 35 to a vehicle structure. The deformable strap 30 engages an adjustable deforming member 25 that has an adjustable total active surface area for engaging the deformable strap 30 for generating a resistance force. The adjustable deforming member 25 moves to adjust the total active surface area to optimize the energy absorbing load of the energy absorbing device 15.

An actuator 40 is associated with the base unit 20 and adjusts the adjustable deforming member 25. A spring attachment member 45 is associated with the base unit 20 and includes the adjustment portion 50. A spring 55 is attached to the base unit 20 at one end 60 and to the spring attachment member 45 at the other end 65. At least one stop 70 is associated with the base unit 20 and is positioned to interact with the adjustment portion 50 of the spring attachment member 45. The actuator 40 moves the at least one stop 70 in response to a control parameter, such as the severity of the crash or the characteristics of a driver such that the adjustable deforming member 25 is adjusted such that its total active surface area engaging the deformable strap 30 is adjusted to optimize the energy absorbing load.

With reference to FIGS. 4, 5 and 6, there is shown a first embodiment of the energy absorbing device 15 of the present invention. As stated above, the energy absorbing device 15 includes a base unit 20.

Figure 3:
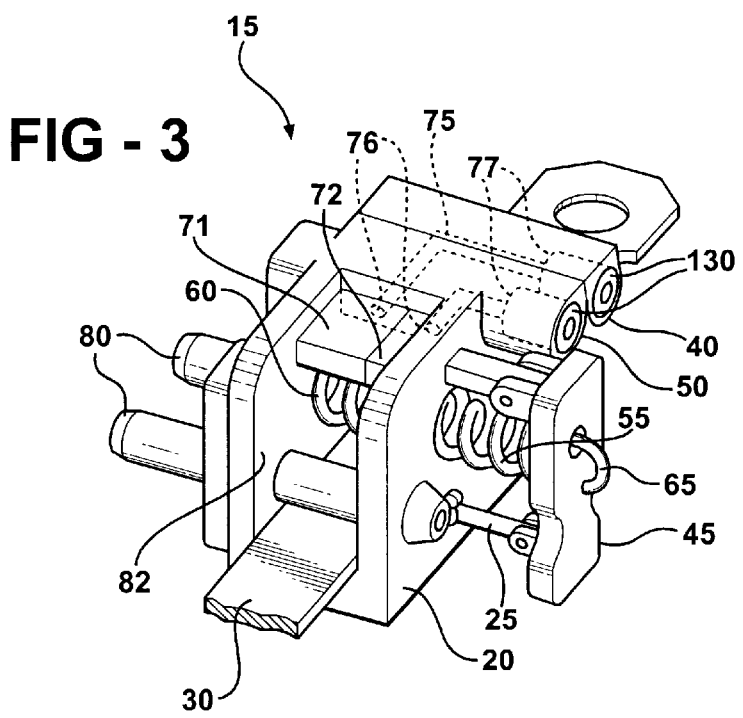
FIG. 3 is a cutaway perspective view detailing the channels formed within the base unit of the energy absorbing device of the present invention.

With reference to FIG. 3, the base unit 20 includes channel 75 formed therein that corresponds to positions of the at least one stop 70. In the pictured first embodiment, there are included two stops 71 and 72 positioned at the ends 76 of the channel 75 formed in the base unit 20. Pyrotechnic actuators 130 are positioned at the opposite ends 77 of the channel 75 and will be discussed in more detail below.

With reference to FIGS. 4, 5 and 6, the base unit 20 also includes rods 80 extending through bores 81 formed in the base unit 20. The rods 80 are positioned such that they engage the deformable strap 30 and provide a reaction surface area on which the strap 30 is deformed. The base unit 20 also includes a slot 82 formed through the base unit 20 in which the deformable strap 30 passes through and is housed by the base unit 20. The rods 80 previously described above, have a portion within the slot 82 that engages the deformable strap 30. The adjustable deforming member 25 disposed within the base unit 20 and has a portion engaging the deformable strap 30 within the slot 82. A spring attachment member 45 is in juxtaposition to the base member 20. The spring attachment member includes an adjustment portion 50 for providing movement to the adjustable deforming member 25. In the first embodiment, the adjustable deforming member 25 comprises a plurality of balls 85 that are disposed within a groove 90 formed in the base unit 20. The plurality of balls 85 include a housing 95 for containing the plurality of balls 85 as they are adjusted within the groove of the base unit 20. The adjustment portion 50 of the spring attachment member 45 of the first embodiment, includes a ball engaging portion 100 and a stop engaging portion 105. The ball engaging portion 100 is disposed within a bore 109 that corresponds with the groove 90 formed in the base unit 20. The stop engaging portion 105 is disposed within a bore 107 that corresponds to a location of the stops 71, 72. As previously described, a spring is attached to the base unit 20 at one end 60 and to the spring attachment member 45 at the other end 65. The spring provides a tension between the base unit 20 and the spring attachment member 45 such that when a stop 70 is removed the stop engaging portion 105 and ball engaging portion 100 move within their corresponding bores to adjust the plurality of balls 85 thereby adjusting the total active surface area for engaging the deformable strap 30 and optimizing a resistance force or energy absorbing load of the energy absorbing device 15. As shown in the first embodiment, the adjustable deforming member 25 which comprises a plurality of balls 85 includes 3 balls 86 disposed within the housing 95. It is to be understood that various numbers of balls other than 3 may be utilized by the present invention to adjust the surface area engaging the deformable strap 30 and depends chiefly on the design parameters and sizes of the balls 86 chosen to be used by the present invention.

The at least one stop 70 of the first embodiment is disposed within a cavity formed in the base unit 20. In the pictured first embodiment, there are included two stops 71, 72 disposed within the cavity of the base unit 20. The stops are preferably frangible plastic components that are independently removed by the actuator 40 in response to control parameters such that the adjustable deforming member 25 is adjusted to correspond to an optimized energy absorbing load based on various control parameters including the severity of the collision, and the characteristics of the driver.

With reference to FIG. 3, there is shown a cutaway view of the base unit 20 detailing the channel 75 formed therein that corresponds to the positions of the stops 71, 72 of the first embodiment. As can be seen from the figure, the stops are positioned at one end of the channel 75 wherein pyrotechnic actuators 130 are positioned at the other end of the channel 75. The pyrotechnic actuators have a response time in the range of less than several milliseconds to adjust a position of the adjustable deforming member 25. The pyrotechnic actuators 130 are triggered in response to control parameters determined by a controller (not shown) such that the stops 71, 72 may be independently removed from the base unit 20 thereby allowing the adjustment portion of the spring attachment member including the ball engaging portion 100 and stop engaging portion 105 to move to adjust a position of the plurality of balls 85 thereby allowing adjustment of the total active surface area engaging the deformable strap 30. The pyrotechnic actuator 130 produces an explosion with sufficient force to remove the stop 71 and allow movement of the plurality of balls 85 within the groove 90. In a preferred embodiment, the initial position of the plurality of balls includes 2 balls in contact with the deformable strap 30. This orientation provides a default position if the electrical system or actuator does not respond to the control parameters and may be set for an average weight male in a moderate collision. With such a default position, most drivers would have sufficient energy absorbing load applied to the column during its collapse stroke. In a severe crash situation or with a large driver, the control may signal actuation of a first of the stops 71 such that 3 balls are engaging the deformable strap 30 thereby providing the maximum energy absorbing load. Alternatively, the second stop 72 may also be removed by actuation of a second pyrotechnic actuator such that only one ball remains in contact with the deformable strap 30 such as in a case of a less severe collision or with a smaller driver. In such a situation, energy absorbing load is produced by the energy absorbing device 15 of the present invention.

Figure 7:
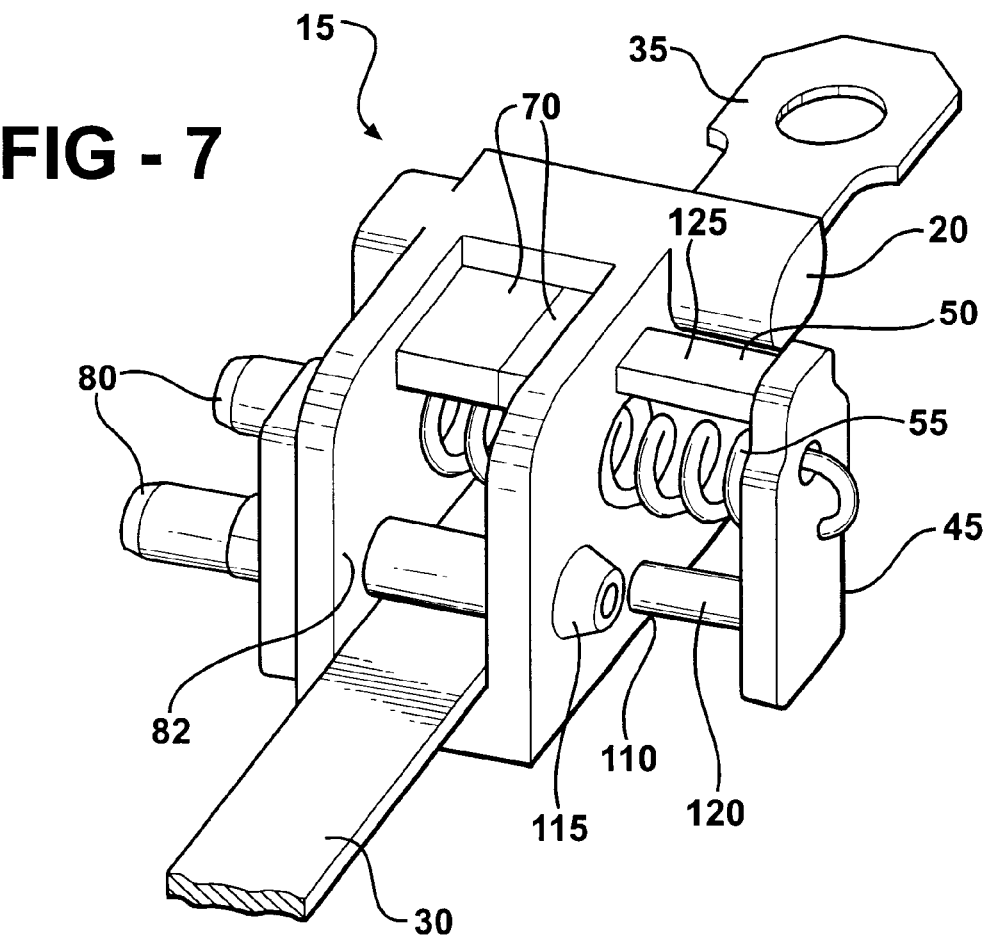
FIG. 7 is a perspective view of a second embodiment of the energy absorbing device of the present invention.

With reference to FIG. 7, there is shown a second embodiment of the energy absorbing device 15 of the present invention. The second embodiment of the energy absorbing device 15 is similar to that of the first embodiment in all respects with the exception that the adjustable deforming member 25 comprises a rod 110 disposed within a bore 115 formed in the base unit 20 rather than a plurality of balls 85 disposed within a groove as described in the first embodiment. The adjustment portion 50 of the spring attachment member 45 of the second embodiment includes a rod engaging portion 120 and a stop engaging portion 125 that are similar in function and shape to that of the ball engaging portion 100 and stop engaging portion 105 of the first embodiment. The rod 110 as with the plurality of balls 85 is adjusted such that the total surface area in contact with the deformable strap 30 is adjusted to optimize the energy absorbing load of the energy absorbing device 15. In the pictured embodiments, the strap 30 is shown as a unitary strip of metal that passes through the slot of the base unit as previously described. Alternatively, the strap may comprise a separated unit with individual straps engaging various portions of the plurality of balls 85 or rod 110. Such a design would not depart from the novel aspect of the invention.

In operation, after a collision has been detected, a controller will process various information including the severity of the collision, as well as the driver to determine an optimized energy absorbing load of the energy absorbing device 15. In response, a pyrotechnic actuator can trigger the removal of a stop 70 such that the adjustable deforming member 25 may be moved to adjust the total active surface area engaging the deformable strap 30. At the outset of linear translation of the steering column housing 10 initiated by the impact force F of the steering hand wheel, the adjusted adjustable deforming member 25 contacts the deformable strap 30 converting a portion of the driver's kinetic energy into work.

While preferred embodiments are disclosed, a worker in this art would understand that various modifications would come within the scope of the invention. Thus, the following claims should be studied to determine the scope and content of the invention.

What is claimed is:

1. An energy absorbing device comprising:
    a base unit;
    an adjustable deforming member disposed within the base unit; a deformable strap housed by the base unit and attached at one end to a vehicle structure, the deformable strap engaging the adjustable deforming member;
    an actuator associated with the base unit for adjusting the adjustable deforming member;
    a spring attachment member associated with the base unit, the spring attachment member including an adjustment portion;
    a spring attached to the base unit at one end and to the spring attachment member at another end;
    at least one stop associated with the base unit and positioned to interact with the adjustment portion of the spring attachment member; and
    the actuator moving the at least one stop in response to a control parameter wherein the adjustable deforming member is adjusted to correspond to an optimized energy absorbing load.

2. The energy absorbing device of claim 1 wherein the base unit further includes channels formed therein corresponding to positions of the at least on stop.

3. The energy absorbing device of claim 1 wherein the base unit further includes rods extending therethrough for engaging the deformable strap and providing a reaction surface area.

4. The energy absorbing device of claim 1 wherein the adjustable deforming member comprises a plurality of balls disposed within a groove formed in the base unit.

5. The energy absorbing device of claim 4 wherein the plurality of balls further include a housing for containing the plurality of balls.

6. The energy absorbing device of claim 4 wherein the adjustment portion of the spring attachment member includes a ball engaging portion and a stop engaging portion.

7. The energy absorbing device of claim 6 wherein the ball engaging portion adjusts a position of the plurality of balls whereby a reaction surface area is adjusted.

8. The energy absorbing device of claim 1 wherein the adjustable deforming member comprises a rod disposed within a bore formed in the base unit.

9. The energy absorbing device of claim 8 wherein the adjustment portion of the spring attachment member includes a rod engaging portion and a stop engaging portion.

10. The energy absorbing device of claim 9 wherein the rod engaging portion adjusts a position of the rod whereby a reaction surface area is adjusted.

11. The energy absorbing device of claim 2 wherein the actuator comprises a pyrotechnic actuator.

12. The energy absorbing device of claim 11 wherein the pyrotechnic actuator is positioned at a first end of the channel with the stop positioned at the other end of the channel.

13. An active energy absorbing system comprising:
    a steering column housing moveable along a collapse stroke;
    an energy absorbing device mounted on the steering column housing exerting a resistance force for resisting movement of the steering column housing along the collapse stroke, the energy absorbing device comprising:
    a base unit;
    an adjustable deforming member disposed within the base unit; a deformable strap housed by the base unit and attached at one end to a vehicle structure, the deformable strap engaging the adjustable deforming member;
    an actuator associated with the base unit for adjusting the adjustable deforming member;
    a spring attachment member associated with the base unit, the spring attachment member including an adjustment portion;
    a spring attached to the base unit at one end and to the spring attachment member at another end;
    at least one stop associated with the base unit and positioned to interact with the adjustment portion of the spring attachment member;
    the energy absorbing system adjusting to optimize an energy absorbing load.

14. The energy absorbing system of claim 13 wherein the system further includes a mounting bracket for attaching the energy absorbing device to the steering column housing.

15. The energy absorbing system of claim 13 wherein the base unit further includes channels formed therein corresponding to positions of the at least one stop.

16. The energy absorbing system of claim 13 wherein the base unit further includes rods extending therethrough for engaging the deformable strap and providing a reaction surface area.

17. The energy absorbing system of claim 13 wherein the adjustable deforming member comprises a plurality of balls disposed within a groove formed in the base unit.

18. The energy absorbing system of claim 17 wherein the plurality of balls further includes a housing for containing the plurality of balls.

19. The energy absorbing system of claim 18 wherein the adjustment portion of the spring attachment member includes a ball engaging portion and a stop engaging portion.

20. The energy absorbing system of claim 19 wherein the ball engaging portion adjusts a position of the plurality of balls whereby a reaction surface area is adjusted.

21. The energy absorbing system of claim 13 wherein the adjustable deforming member comprises a rod disposed within a bore formed in the base unit.

22. The energy absorbing system of claim 21 wherein the adjustment portion of the spring attachment member includes a rod engaging portion and a stop engaging portion.

23. The energy absorbing system of claim 22 wherein the rod engaging portion adjusts a position of the rod whereby a reaction surface area is adjusted.

24. The energy absorbing system of claim 14 wherein the actuator comprises a pyrotechnic actuator.

25. The energy absorbing system of claim 24 wherein the pyrotechnic actuator is positioned at a first end of the channel with the stop positioned at the other end of the channel.

* * * * *